United States Patent Office.

FÉLICIE F. N. MARAIS, OF NEW YORK, N. Y.

Letters Patent No. 92,855, dated July 20, 1869.

---

IMPROVED WASHING AND CLEANSING FLUID.

---

The Schedule referred to in these Letters Patent and making part of the same.

---

*To all whom it may concern:*

Be it known that I, FÉLICIE F. N. MARAIS, of the city, county, and State of New York, have invented or discovered a new and useful Washing and Cleansing-Fluid; and I do hereby declare that the following is a full, clear, and exact description of the same.

My invention has for its object the preparation of a cleansing-fluid applicable, among other purposes, to the washing of family and other linen, without injury to the fabric, and whereby labor is greatly economized, which, in household and large establishments, is a matter of considerable importance.

Said preparation is made substantially as follows, although the proportion of the several ingredients may be more or less varied.

I mix, for instance, with ten gallons (10 gal.) of cold water, forty-two pounds (42 lbs.) of soda, one pound (1 lb.) of muriate of ammonia, two pounds (2 lbs.) of carbonate of ammonia, one pound (1 lb.) of oxalic acid, and two pounds (2 lbs.) of liquor ammonia.

For washing and cleansing linen, it will suffice to mix with every twelve gallons (12 gal.) of cold water the contents of a twelve-ounce (12 oz.) bottle or vial of this preparation, applying a little soap on every article to be washed, and particularly upon those which are greasy or stained. The linen, having been immersed, should be left to steep in the mixture thus made for several hours before washing; preferably an entire night. The whole should then be boiled for half an hour (more or less) and the linen rubbed to remove the dirt, after which it should be rinsed two or three times in cold water. It is important that the linen should be completely immersed, otherwise some stains might remain. In using this preparation, "bluing" may be dispensed with.

The water, having the preparation mixed with it, after having been used for fine linen, may afterwards serve to wash coarser articles.

Flannels, and various kinds of knitted articles, may be perfectly cleansed by the use of this preparation.

By increasing the quantity of the fluid or preparation to its mixture with water, to the extent of at least one-fourth, (more or less,) it will serve to cleanse perfectly all wood-work which is painted white, or by using the preparation pure, and rubbing it by a brush or rag on the part required to be cleaned, it will completely remove, and with great facility, printers' ink, and all greasy or gummy matter, as well as rust; will clean or remove grease from machinery most effectually, and serves to restore articles of various kinds, upon which it is used, to the most perfect state of cleanliness.

What is here claimed, and desired to be secured by Letters Patent, is—

The washing and cleansing-fluid, substantially as herein specified.

FÉLICIE F. N. MARAIS.

Witnesses:
FRED. HAYNES,
HENRY PALMER.